United States Patent
Wagoner

(10) Patent No.: US 9,337,657 B2
(45) Date of Patent: May 10, 2016

(54) POWER UNIT CONTROL SYSTEM

(71) Applicant: General Electric Company, Schenectady, NY (US)

(72) Inventor: Robert Gregory Wagoner, Salem, VA (US)

(73) Assignee: General Electric Company, Schenectady, NY (US)

( * ) Notice: Subject to any disclaimer, the term of this patent is extended or adjusted under 35 U.S.C. 154(b) by 762 days.

(21) Appl. No.: 13/687,831

(22) Filed: Nov. 28, 2012

(65) Prior Publication Data
US 2014/0145508 A1    May 29, 2014

(51) Int. Cl.
    *H02J 3/00*    (2006.01)
    *H02J 3/28*    (2006.01)
    *H02J 3/32*    (2006.01)
    *H02J 9/06*    (2006.01)

(52) U.S. Cl.
    CPC ... *H02J 3/28* (2013.01); *H02J 3/32* (2013.01); *H02J 9/062* (2013.01); *Y10T 307/50* (2015.04); *Y10T 307/658* (2015.04)

(58) Field of Classification Search
    CPC .............................. H01L 31/0583; H02J 3/28
    USPC ........................................................ 307/72
    See application file for complete search history.

(56) References Cited

U.S. PATENT DOCUMENTS

| | | | | |
|---|---|---|---|---|
| 5,663,627 A | * | 9/1997 | Ogawa | F24F 11/0009 318/803 |
| 5,773,955 A | * | 6/1998 | Hall | H02J 7/022 320/104 |
| 6,072,302 A | * | 6/2000 | Underwood | H02J 3/38 322/17 |
| 7,629,705 B2 | * | 12/2009 | Barker | H02P 9/007 290/55 |
| 2011/0140649 A1 | | 6/2011 | Choi | |
| 2012/0228935 A1 | | 9/2012 | Nakashima et al. | |

FOREIGN PATENT DOCUMENTS

| | | |
|---|---|---|
| DE | 20002237 U1 | 7/2000 |
| DE | 10 2008 018 497 A1 | 10/2009 |
| EP | 2477298 A1 | 7/2012 |

OTHER PUBLICATIONS

International search report and written opinion issued in corresponding WO Application, PCT/US2013/067671, Mar. 5, 2014.

* cited by examiner

*Primary Examiner* — Stephen W Jackson
(74) *Attorney, Agent, or Firm* — Fletcher Yoder, P.C.

(57) ABSTRACT

A system is provided that includes a plurality of power units each configured to supply power. Additionally, the system includes a plurality of contacts each configured to toggle an electrical connection of each of the plurality of power units as a network. Moreover, the network is configured to supply power to a load. Furthermore, the system includes a controller configured to control when each of the plurality of contacts toggle according to a power state, and the power state includes information regarding a charge of each power unit, a load demand, and a supplied power being supplied by the plurality of power units.

17 Claims, 5 Drawing Sheets

| 222 | 224 | 226 | 228 | 230 |
|---|---|---|---|---|
| 0 | A | C | E | E |
| 1 | A | C | F | H |
| 2 | B | D | G | I |
| 3 | A | C | E | E |

POWER UNIT CONTROL SYSTEM

BACKGROUND OF THE INVENTION

The subject matter disclosed herein relates to maintaining a connection between a power supply bank and a utility grid.

Power supply banks are used to supply power to various electrical systems or provide auxiliary or emergency power (e.g., uninterruptible power supply) to a utility grid during losses in power through a power converter. Power supply banks may include a variety of various power supply systems, such as battery energy storage systems. Under certain conditions, the utility grid experiences power fluctuations (e.g., blackouts and brownouts) that may include various electrical faults. In certain situations, power supply banks may be susceptible to interference with operation and electrical connections due to the power fluctuations of the utility grid.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a power supply bank configured to provide a supplied power to a utility grid and a power converter configured to boost and to regulate the supplied power. The system also includes an inverter configured to regulate a first voltage and to regulate an output current with the output current being the current of an output power provided to the grid. Additionally, the system includes a voltage bus having the first voltage. Furthermore, the system includes a first controller. The first controller is configured to maintain electrical connection between the power supply bank and the utility grid during a power fluctuation in the utility grid by controlling power flowing through the system by controlling the power converter or by controlling the first voltage by controlling the inverter.

In a second embodiment, a method includes supplying power having a first voltage from a power supply bank as direct current to a power converter. The method also includes amplifying the first voltage for the power through the power converter to a second voltage, which is the voltage of an amplified power at the voltage bus. Additionally, the method includes converting the amplified power to alternating current in an inverter, regulating the current of the amplified power with the inverter, and supplying the amplified power to a utility grid. Furthermore, the method includes maintaining an electrical connection between the power supply bank and the utility grid during a power fluctuation.

In a third embodiment, a system includes a power supply bank configured to provide a supplied power as direct current at a first voltage. The system also includes a plurality of power converters each configured to boost the supplied power to a second voltage. Additionally, the system includes a plurality of inverters configured to convert the supplied power to alternating current and to regulate the second voltage and an output current. The system further includes a plurality of voltage busses each having the second voltage and electrically coupling one of the plurality of power converters to a respective one of the plurality of inverters. Furthermore, the system includes at least one controller configured to maintain connection between the power supply bank and a utility grid during a power fluctuation by controlling the power through the system using at least one of the plurality of power converters or controlling the second voltage using at least one of the plurality of inverters.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
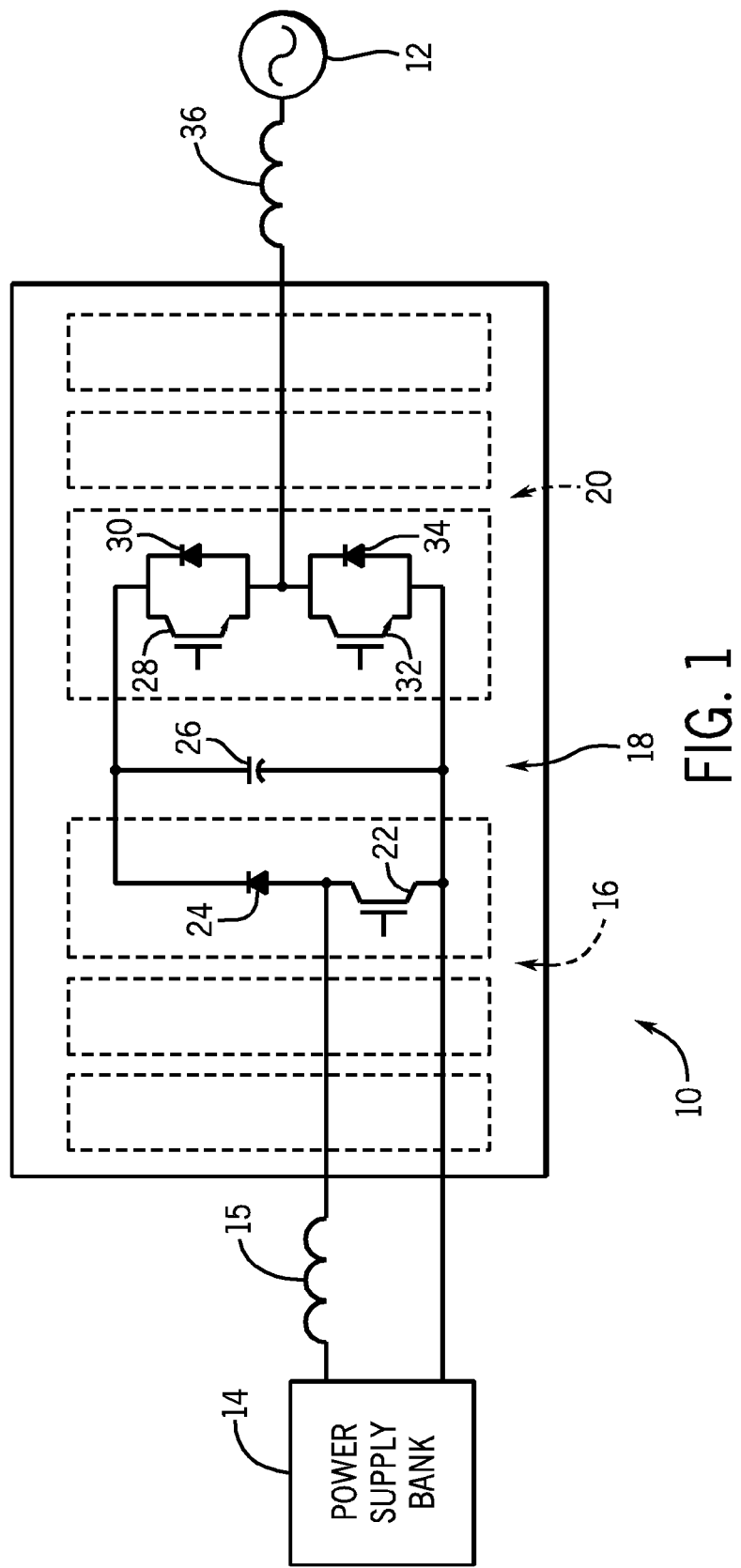
FIG. 1 illustrates a schematic view of an embodiment of a power supply system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Various embodiments of the present invention include managing one or more power supply banks with a controller. Within each power supply bank are multiple power units, such as batteries, battery cells, capacitors, and/or supercapacitors. The power supply banks provide power to one or more loads. The controller determines the load demand. In some embodiments, the demand may be dynamic, such as loads (e.g., utility grid) being additionally powered by a wind farm (e.g., multiple wind turbines), solar power sources, and/or other renewable resources. Specifically, some of these sources provide power intermittently to the utility grid depending on certain conditions (e.g., presence of wind or availability of sunlight). As can be appreciated, transients may occur in the grid that may cause the system to lose connectivity between the grid and the power supply bank.

Accordingly, a controller may be used to maintain connection between a power supply bank and the grid by using a regulator to control the power supply connection. Additionally, the supply connection may be used to convert the power from the power supply bank (e.g., lower voltage DC) to a type suitable to supply the grid (e.g., higher voltage AC). Accordingly, a power supply bank may be directly controlled by the controller rather than using a separate converter to convert the power from DC to AC and separate regulator to regulate the resultant AC power.

In such embodiments, the controller determines the power available in the power supply banks and/or power units to arrange the power units in a suitable arrangement, such as a parallel arrangement, series arrangement, a power-saving arrangement, or a reverse polarity arrangement. In certain embodiments, the controller may prioritize the loads according whether the function performed by the load (e.g., fire prevention) is critical to the system (e.g., power plant). In such embodiments, the controller may reserve power for critical loads in case of extended or repeated losses of power (e.g., blackouts or brownouts). Additionally, the power supply banks and/or power units may be recharged in a prioritized order to recharge power supply banks and/or power units that supply critical loads before recharging power supply banks and/or power units that supply non-critical loads.

FIG. 1 illustrates an embodiment of a power supply system 10. The power supply system 10 provides power to a utility grid 12. In certain embodiments, the power supply system 10 may provide power during power loss in the utility grid 12 (e.g., blackout or brownout) or other suitable occasions as an auxiliary power or an emergency backup system. For example, the power supply system 10 may supply power to the utility grid 12 when a solar energy source, wind turbine, and/or other renewable resources lessen or stop providing power to the utility grid. In other embodiments, the power supply system 10 may provide continuous power to the utility grid 12. The power supply system 10 includes a power supply bank 14, one or more power converter inductors 15, one or more power converters 16, a voltage bus 18, and one or more inverters 20. The power supply bank 14 may include multiple power units such as batteries, capacitors, or super-capacitors. In certain embodiments, the power supply bank 14 may contain power units can provide a megawatt (MW) of direct current (DC) power. In other embodiments, the power supply bank 14 may contain power units that can provide 100, 200, 300, 400, 500, 600, 700, 800, 900, or more kilowatts (kW) of DC power.

Power is supplied from the power supply bank 14 to one or more power converters 16 through a corresponding one or more power converter inductors 15. In certain embodiments, the power may be supplied at a selected voltage of 500 V. In other embodiments, the voltage provided by the power supply bank 14 may be 100, 200, 300, 400, or move volts. When the DC power passes through each of the one or more power converter inductors 15, each of the one or more power converter inductors 15 smoothes the current and stores energy for use in a corresponding power converter 16. After passing through the boost each of the one or more power converter inductors 15, the power is supplied to a corresponding one or more power converters 16. Although the illustrated embodiment, shows only one DC connection from the power supply bank 14 to one power converter 16 (e.g., DC-to-DC converter), certain embodiments of the power supply system 10 include providing power to 2, 3, 4, or more power converters 16 each connected parallel to each other. Furthermore, each of the one or more power converters 16 includes a semiconductor switch 22 and a diode 24. In certain embodiments, the semiconductor switch 22 may be a transistor such as an insulated gate bipolar transistor (IGBT) capable of efficiently switching at rapid rates. As will be appreciated, in certain embodiments, the switch rate of the switch 22 may be controlled by a controller designed to adjust the switch rate to achieve a desired voltage in response to various factors. In some embodiments, the diode 24 may be replaced with active rectification circuitry to enable recharge of the power supply bank 14 from the utility grid 12 or another suitable power source through the power converter 16. As will be appreciated, in the various embodiments, the semiconductor switch 22 and the diode 24 operate in a switched mode to boost the voltage supplied by the power supply bank 14 (e.g., 500 V) to a higher voltage (e.g., 800 V). The higher voltage is the voltage across a voltage bus capacitor 26 for the voltage bus 18.

The voltage bus 18 carries the higher voltage to one or more inverters 20. In certain embodiments, the number of inverters 20 corresponds to the number of power converters 16 and/or alternating current (AC) of a signal sent to the utility grid 12. For example, certain embodiments include three power converters 16 each coupled to a corresponding inverter 20 with either a common voltage bus or one voltage bus for each power converter-inverter pair. Other embodiments may include a different number of power converters 16 and phases. For example, some embodiments may include three power converters 16 each coupled to a respective inverter 20, but the AC signal supplied to the utility grid. Additionally, certain embodiments may supply a single phase, three-phase, or multi-phase AC signal to the utility grid 12.

Within each inverter 20, suitable circuitry inverts the DC power across the voltage bus 18 to a power suitable for supplying to the utility grid 12. For example, the illustrated embodiment of the power supply system 10 includes a half-h bridge configuration having an upper switch 28, an upper antiparallel diode 30, a lower switch 32, and a lower antiparallel diode 34. In other embodiments, the inverters may include a full-bridge, push-pull configuration, or other suitable circuitry for DC to AC conversion known in the art. In the illustrated embodiment, the switches 28 and 30 may include IGBT devices or other transistors or suitable switches, and the antiparallel diodes 30 and 34 provide paths for peak inductive load currents to travel when a respective switch 28 or 30 is open. As will be appreciated, in certain embodiments, the switches 28 and 30 of multiple inverters 20 may be driven by a controller that offsets the signals created by each inverter 20 such that each inverter creates a different phase. For example, such embodiments of the power supply system 10 may include three inverters 20 toggling each switch to create a three phase or six inverters 20 toggling to create a six phase system. Furthermore, other embodiments may include different numbers of inverters 20 and phases. For example, such embodiments may include six inverters 20 coupled in pairs such that the six inverters 20 produce three phase power at a higher current. Although the previous discussion includes only one-phase, three-phase, and six-phase power, certain embodiments may include 1-, 2-, 3-, 4-, 5-, 6-, or more phase power. Similarly, some embodiments may include 1, 2, 3, 4, 5, 6, or more inverters 20 either related to the number of phases or independent from the number of phases.

Furthermore, as will be appreciated, in certain embodiments, the inverters 20 and/or the power converters 16 may be designed in a bi-directional manner (e.g., having active rectification in place of the antiparallel diodes 30 and 34) in order to enable recharge of the power supply bank 14 through the power supply system 10. In such embodiments, the power supply bank 14 may be recharged with power supplied by the utility grid 12 or another suitable power supply. For example, in some embodiments, the power supply bank 14 may be at least partially depleted by supplying power to the utility grid 12 when a utility grid 12 loses power, and the utility grid 12 may provide power back to the power supply back 14 through the inverters 20 and/or the power converters 16 when power is restored to utility grid 12. Moreover, certain embodiments of the power supply system 12 may include an AC filter inductor 36 configured to filter the AC being supplied to the utility grid 12 or from the utility grid 12 during a recharge state.

Figure 2:
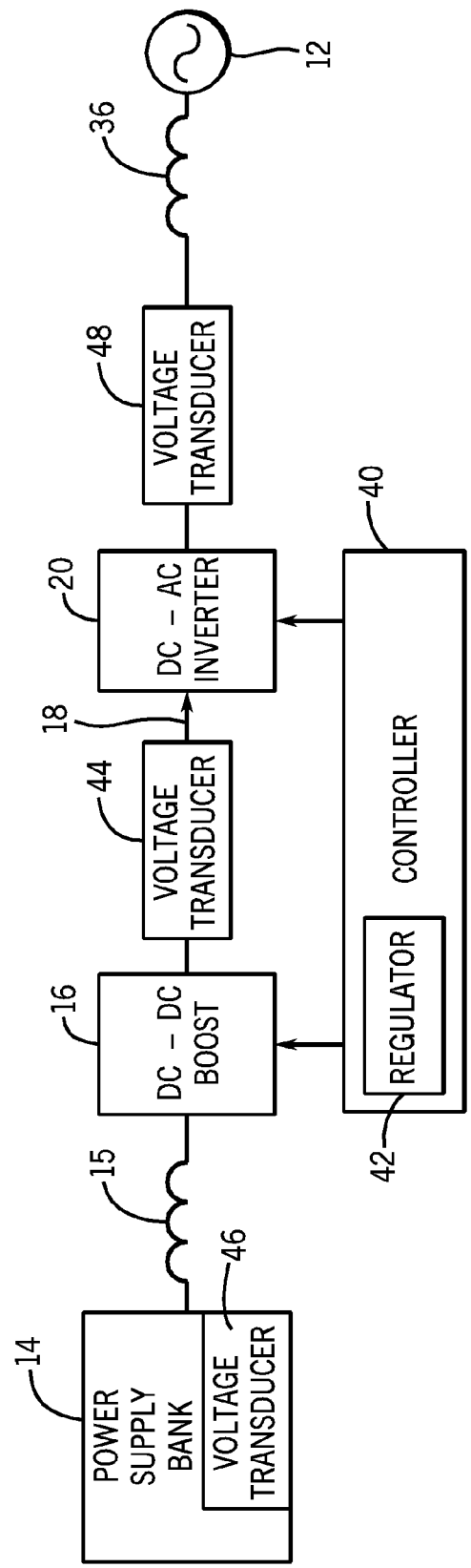
FIG. 2 illustrates a block diagram view of an embodiment of the power supply system of FIG. 1 with a controller.

FIG. 2 illustrates a block diagram view of an embodiment of the power supply system 10 with a controller 40. In the illustrated embodiment, the power supply system 10 includes one controller 40 configured to control both the power converter 16 and the inverter 20, but other embodiments may include one controller dedicated to regulating the power converter 16 and another controller dedicated to controlling the inverter 20. The controller 40 regulates power flowing through the power supply system 10 by regulating the power converter 16. In certain embodiments, the controller 40 determines the power flowing through the system according to power available in the power supply bank 14, the power available in the utility grid 12, the demand on the utility grid 12, and/or another relevant factor. In other words, the controller 40 uses the power converter 16 to control the flow of total power from the batteries through the power supply system 10. The controller 40 (or another controller) regulates the inverter 20 to control the DC voltage of the voltage bus 18 and the current (both real and reactive) of the AC power being delivered to the utility grid 12. In other words, one or more controllers 40 control the power passing through the system using the power converter 16, and the same or another controller 40 regulates the voltage of the voltage bus 18 and output current. In embodiments having more than one power converter and or more than inverter, a single controller may be configured to control each power converter and/or inverter. Alternatively, one controller may be configured to control one or more power converters, one or more inverters and/or one power converter-inverter pair.

In certain embodiments, each controller 40 may be implemented using one or more microprocessors. Furthermore, each controller 40 includes at least one processor and a memory, at least one processor input channel, and at least one processor output channel. The controller 40 may also include a microcontroller, a microcomputer, a programmable logic controller (PLC), an application specific integrated circuit, and other programmable circuits. In certain embodiments, the memory may include any computer-readable medium, such as a random access memory (RAM), a floppy disk, a compact disc read only memory (CDROM), a digital versatile disc (DVD), or another suitable memory. The input channels may include input devices such as a mouse, a keyboard, a scanner, a touch screen, temperature sensors, electrical sensors, speed transducers, power transducers, and/or other suitable input device. The output channels may include output devices such as a monitor, a touch screen, a printer, or other suitable methods for outputting information to an operator.

As will be appreciated, the processors process information from the memory and/or one or more input channels to execute instructions that control the power converter 16 and/or inverter 20. The processors may propagate the instructions through the output channels or direct connection with the power converters 16 and/or inverters 20.

As described below, the controller 40 further includes a regulator 42. In some embodiments, the regulator 42 may include a phase-locked loop (PLL) regulator, a frequency locked loop (FLL) regulator, a proportional-integral-deriva-tive (PID) controller, or other suitable feedback control loop. In embodiments having a PLL, the regulator 42 may include a Type I PLL (e.g., having a single pole at origin), a Type II PLL (e.g., having two poles at origin with one from a VCO and a second one from a loop filter/charge pump). Embodiments of the regulator 42 that include an FLL may be less sensitive to phase disturbances than a regulator 42 having a PLL. Moreover, in embodiments of the regulator 42 that include a PID controller may use present, past, and predicted values (e.g., using the rate of change) to regulate the power supply system 10. In the various embodiments, the controller 40 is configured to receive one or more voltage measurement signals from one or more voltage transducers 44, 46, and 48. In certain embodiments, one voltage transducer 44 may be coupled to the voltage bus 18, one or more voltage transducers 46 may be coupled to the power supply bank 14, and one or more transducers 48 may be coupled to various phases of the AC output. In some embodiments, voltage transducers are electrically coupled electrically coupled to any portion of the power supply system 10 that facilitates operation of the system as described herein. The regulator 42 is coupled in electronic data communication with the controller and/or voltage transducers via one or more electrical conduits.

Figure 3:
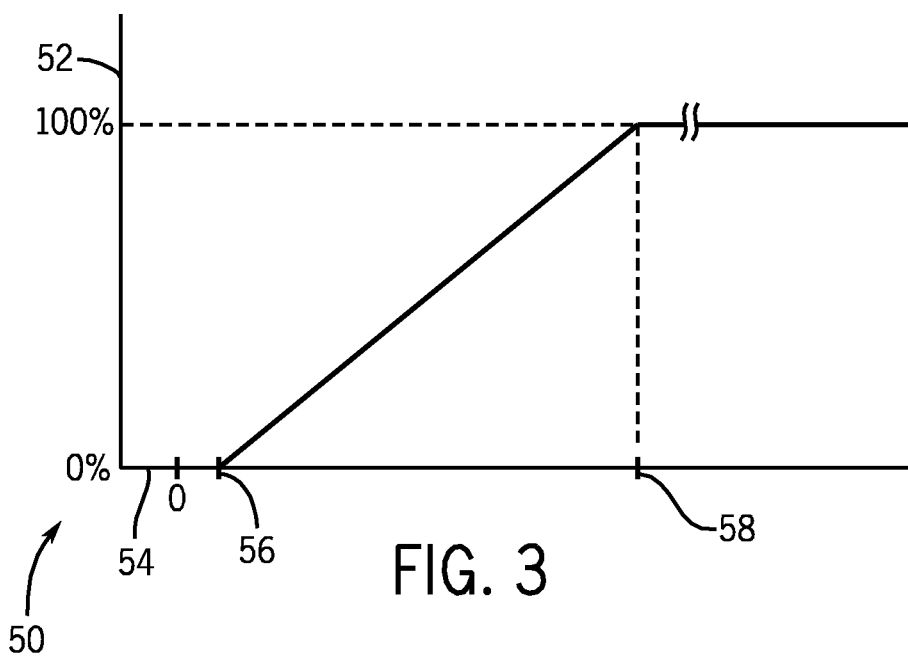
FIG. 3 illustrates a graphical view of grid line voltage versus time that may be associated with the power supply system of FIG. 1.

FIG. 3 illustrates a graphical view of grid line voltage versus time 50 that may be associated with the power supply system 10. Graph 50 includes an ordinate 52 that represents grid line voltage measured in percentages ranging from 0% to 100%. 100% represents the grid line voltage at a nominal desired voltage associated with the power supply system 10. Additionally, 0% represents zero voltage on the grid line. Graph 50 also includes an abscissa 54 that represents time in seconds. A zero voltage transient is illustrated on graph 50 beginning at 0 seconds. The zero voltage condition persists until zero condition time 56. The voltage condition continues to respond until recovery time 58 when the voltage has returned to nominal voltage. In other words, the zero voltage condition endures from 0 seconds until zero condition time 56 when the voltage begins to recover. Moreover, the voltage recovers totally in the time it takes to transition from 0 seconds to recovery time 58 to return to nominal voltage (100%) after a zero voltage transient. In certain embodiments, the zero condition time 56 and recovery time 58 may vary.

As will be appreciated, when the voltage decreases to zero, certain faults may prevent some embodiments of a power supply system from transmitting electrical power to the grid. During faults in such embodiments, the power supply systems may trip, go off-line, and become disconnected from the utility grid 12 during a power fluctuation from the utility grid 12. As will be appreciated, it is often desirable to maintain a communicative connection between the utility grid 12 and the power supply system 10 during a power fluctuation from the utility grid 12.

Figure 4:
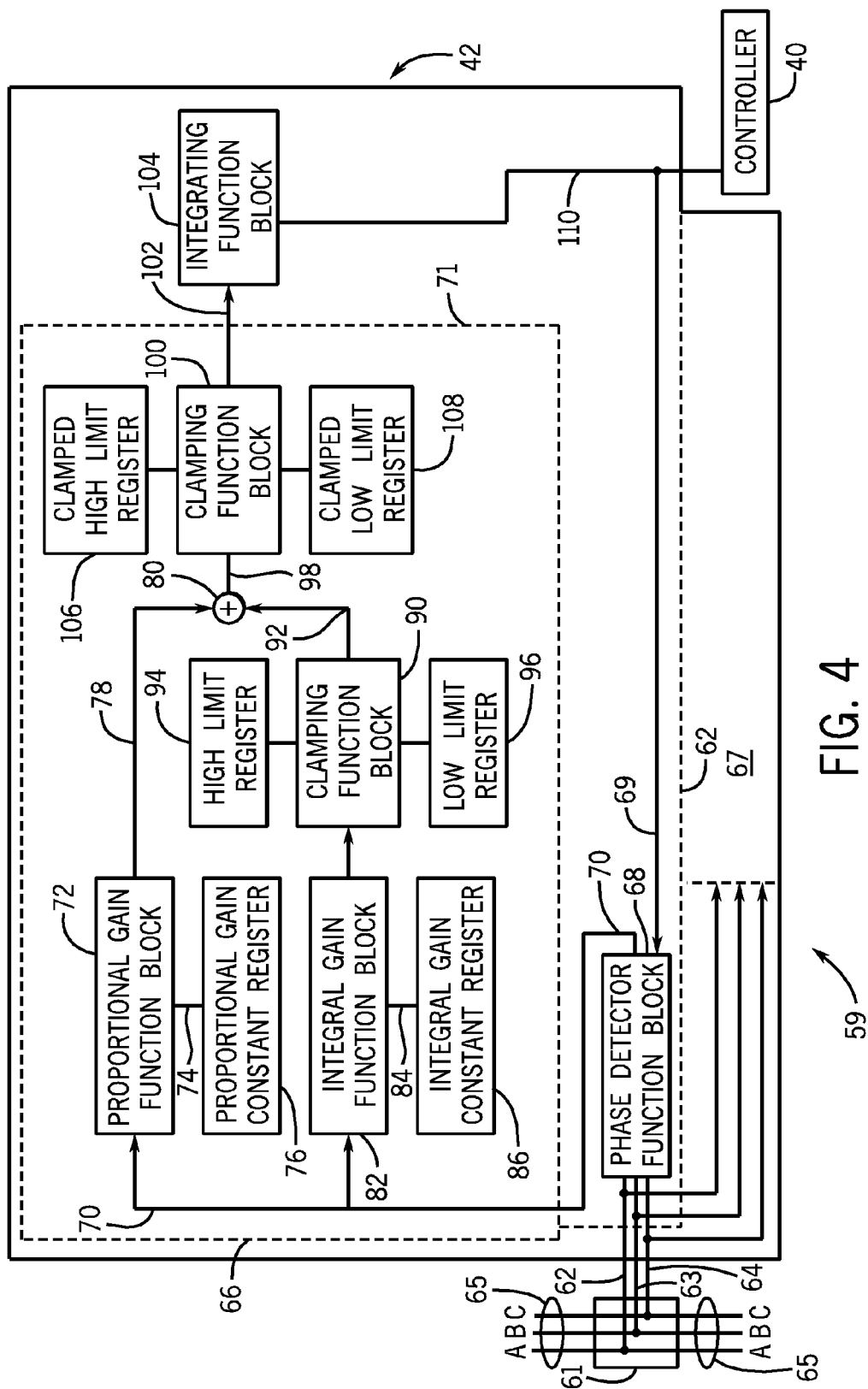
FIG. 4 illustrates a block diagram view of an embodiment of a regulator that may be used with the power supply system of FIG. 1.

FIG. 4 illustrates a block diagram view of an embodiment of regulator 42 that may be used with the power supply system 10. As discussed below, the regulator 42 is configured to facilitate a zero voltage ride through (ZVRT) capability for the power supply system 10 such that the likelihood of trip and disconnection from the utility grid 12 are reduced and/or mitigated during a power fluctuation (e.g., graph 50). ZVRT differs from low voltage ride through (LVRT) because the ZVRT enables maintaining connection to the utility grid 12 through a power fluctuation of the utility grid 12, even a power fluctuation to 0V.

The regulator 42 is coupled in electronic communication with one or more voltage transducers 61 via electrical conduits 62, 63, and 64 for phases A, B and C of a grid bus 65. In certain embodiments, the conduits 62, 63, and 64 may be electrical cables or another suitable electrical connection such as a network of transmitters and receivers operating in a designated frequency. The voltage transducers 61 transmit sinusoidal voltage measurement signals through the conduits 62, 63, and 64 for each of the respective three phases A, B and C.

In certain embodiments, the regulator 42 may be configured as a plurality of function blocks within a processor. Additionally, in the illustrated embodiment, the regulator 42 is external to controller 40, but other embodiments may include the regulator 42 within a processor associated with controller 40.

In certain embodiments, the regulator 42 includes at least one control loop) 66. This control loop 66 may include a PLL, FLL, or PID controller. As will be appreciated, a PLL is a closed-loop feedback scheme that maintains signals generated by the PLL in a fixed phase relationship with a reference signal. The PLL-generated signal is constantly adjusted to match the frequency of the reference signal in phase, i.e., the PLL "locks on" to the reference signal. In the illustrated embodiment, the control loop 66 locks on to the frequency of bus 65. Additionally, the PLL regulator 42 includes at least one PLL state machine 67 described in further detail below. Moreover, a FLL is a closed-loop feedback scheme that maintain signals generated by the FLL in relationship with a reference signal. The FLL-generated signal is adjusted to match the frequency of the reference signal. Furthermore, a PID controller is a control loop that uses three parameters: a proportional (P) value that varies according to present values, an integral (I) value that changes according to the accumulation of values, and a derivative (d) value that varies according to fluctuations of a rate of change. Although the following discussion refers to a regulator 42 including a PLL, some embodiments include a PLL, an FLL, a PID, or a combination thereof.

The control loop 66 including a PLL also includes a phase detector function block 68 that is configured to receive the sinusoidal voltage measurement signals transmitted from conduits 62, 63, and 64 for each respective A-phase, B-phase, and C-phase of grid bus 65. Function block 68 is also configured to receive a phase angle feedback signal 69 and subsequently combines the voltage measurement signals with signal 69 to a generate phase error signal 70. In certain embodiments, the signal 70 may be measured in radians (r), but other embodiments may measure the signal 70 in degrees or another suitable measurement. In embodiments where the control loop 66 includes an FLL, the detector function block 68 would detect the frequency and the feedback signal 69 would indicate frequency feedback.

The control loop 66 also includes a proportional-integral (PI) filter 71. Moreover, the PI filter 71 includes a proportional gain function block 72. Function block 72 is configured to receive signal 70 and a proportional gain constant signal 74 from a proportional gain constant register 76. The register 76 is populated with values determined as a function of a state (or, PLL mode in embodiments of control loops 66 having a PLL) as determined by the state machine 67 as described below. The function block 72 multiplies the phase error signal 70 by the proportional gain constant signal 74 to generate a proportional gain signal 78 and transmits the proportional gain signal 78 to a summation function block 80. Moreover, in embodiments measuring the phase error signal 70 in radians, the proportional gain signal 78 may be measured in radians over time (e.g., radians/seconds).

The PI filter 71 also includes an integral gain function block 82. The function block 82 receives the phase error signal 70 and an integral gain constant signal 84 from an integral gain constant register 86. The register 86 may be populated with values determined as a function of a state (or, PLL mode) determined by state machine 67 as described below. The integral gain function block 82 is further configured to integrate signal 70 with respect to time and multiply the integral value by the signal 84 to generate and transmit an integral gain signal 88 to a clamping function block 90. In embodiments measuring the phase error signal 70 in radians, the integral gain signal 88 may be measured in radians over time (e.g., radians/seconds). The function block 90 is a filter mechanism that enables a clamped integral gain signal 92 to transmit to the summation function block 80 if the signal 88 resides between a high limit and a low limit. In certain embodiments, the clamped integral gain signal 92 may be measured in radians over time (e.g., radians/seconds). If the integral gain signal 88 is outside of a range defined by the high and low limits, the function block 90 blocks the signal 88 from further transmission. A high limit register 94 is populated with high limit values as determined by the state machine 67, described below, and transmits a corresponding high limit value to the function block 90. Similarly, a low limit register 96 is populated with low limit values as determined by the state machine 67 and transmits a corresponding low limit value to the function block 90.

Summation function block 80 sums signals 78 and 92 to generate a PI signal 98. In certain embodiments, the PI signal 98 may be measured in radians over time (e.g., radians/second). The summation function block 80 then transmits the signal 98 to a clamping function block 100. The function block 100 is a filter that enables a clamped integral gain signal 102 to be transmitted to an integrating function block 104 if the signal 98 resides between a high limit and a low limit. In certain embodiments, the signal 102 may be measured in radians/second (r/s). In contrast, if the signal 98 resides outside of the range defined by a clamped high and a clamped low limit, signal 98 is blocked from further transmission. A clamped high limit register 106 is populated with high limits for the clamped integral gain signal 102 determined by the state machine 67. Likewise, a clamped low register 108 is populated with low limits for the clamped integral gain signal 102 determined by the state machine 67.

Integrating function block 104 receives the clamped integral gain signal 102 and integrates the signal 102 with respect to time. The function block 104 generates a phase angle signal 110 that is transmitted to other portions of the controller 40 for controlling the power supply system 10 for subsequent operation and the phase angle signal 110 is fed back into the phase detector function block as the phase angle feedback signal 69.

Figures 5, 6:
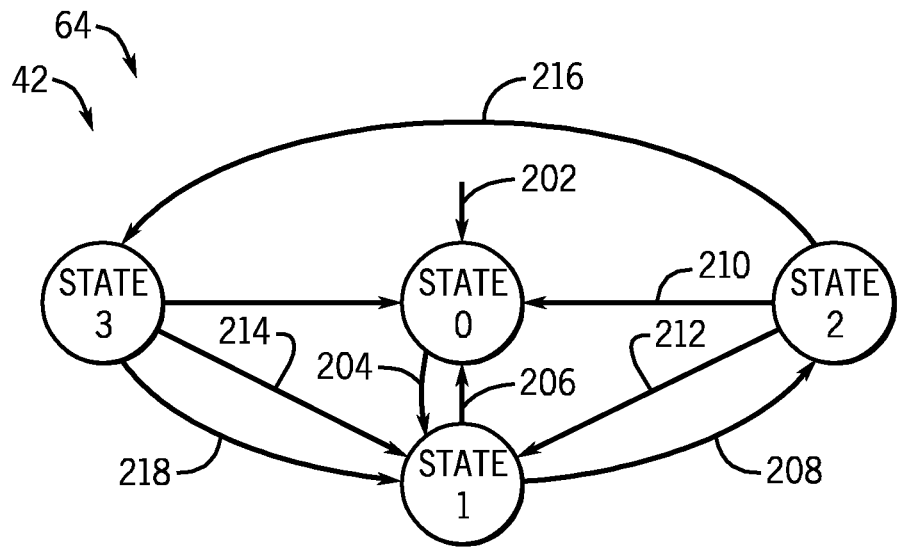
FIG. 5 illustrates a block diagram view of a state machine that may be used with the phase locked loop regulator of FIG. 4.
FIG. 6 illustrates a tabular view of a multiple gain constants and frequency limit values generated as a function of state as determined by the state machine of FIG. 5.

FIG. 5 illustrates a block diagram view of a phase locked loop state machine 67 that may be used with the phase locked loop regulator 42 of the power supply system 10. In the illustrated embodiment, the state machine 67 is configured to step the regulator 42 through at least one of four states (e.g., modes) of operation as a function of characteristics of voltage signals received as described above using transition paths 204, 206, 208, 210, 212, 214, 216, 218, and 220. Alternatively, the state machine 67 and regulator 42 includes any number of states that facilitates operation of the power supply system 10 as described herein. Each change of state of operation may include a dynamic switching of gain constant aggressiveness and clamp restrictions contained within the registers 76, 86, 94, 96, 106 and 108. Such switching may be configured to be continuous, discrete, or some combination thereof. As discussed below, the multiple states of operation facilitate zero voltage ride through (ZVRT) as well as other grid faults (e.g., power fluctuations) while facilitating operation of the power supply system 10. These features facilitate managing such gains and clamps dynamically as a function of the voltage characteristics of the grid 12 to which the control loop 66 is attempting to lock.

The state machine 67 receives grid voltage measurement signals transmitted to the regulator 42 from the transducers 61 via the conduits 62, 63, and 64. The state machine 67 is further configured to receive a "power up" input signal 202 upon successful initiation of the regulator 42. Receipt of the input signal 202 induces the state machine 67 to shift to state 0. State 0 is characterized by the state machine 67 preconditioning a set of values to populate registers 76, 86, 94, 96, 106 and 108. In certain embodiments, after a pre-determined period of time (e.g., a couple seconds), the state machine 67 shifts regulator 42 to state 1. When shifting, the state machine 67 shifts the regulator 42 to state 1 via the transition path 204. Upon shutdown, the state machine 67 shifts regulator 42 from state 1 back to state 0 via transition path 206.

Moreover, after a pre-determined period of time in state 1 and after the control loop 66 locks on to the grid frequency, state machine 67 shifts regulator 42 to state 2 via the transition path 208. Upon shutdown, state machine 67 shifts regulator 42 to state 0 from state 2 via the transition path 210. In the event of a non-synchronous grid fault, abnormally low (not zero) and/or high grid voltage amplitudes, and/or the phase error signal 70 exceeds a predetermined threshold, the state machine 67 shifts the regulator 42 to state 1 from state 2 via a transition path 212. Alternatively, any other conditions that facilitate operation of power supply system 10 as described herein may be used to urge the state machine 67 to shift the regulator 42 between states.

While in state 1, the appropriate gain and clamp values are in stored in the appropriate registers as described below. After the grid voltage has been restored to a pre-determined value, a pre-determined period of time has elapsed after the control loop 66 locked on to the grid frequency, and the error signal 70 remains below a pre-determined threshold for a pre-determined period of time, the state machine 67 shifts the regulator 42 to state 2 from state 1 via the transition path 208. While in state 2, the appropriate gain and clamp values are stored in the appropriate registers as described below thereby enabling a LVRT.

While the regulator 42 is in state 1, the state machine 67 may shift the regulator 42 to a state 3 via the transition path 214 when the utility grid voltage is OV. Similarly, while regulator 42 is in state 2, the state machine 67 may shift the regulator 42 to state 3 via the transition path 216 when the utility grid voltage is OV. In other words, certain embodiments include a state machine 67 configured to shift the regulator 42 from a respective state 1 and/or 2 to state 3 when a grid voltage disturbance (e.g., power fluctuation associated with a symmetric fault) decreases voltage of the utility grid 12 to zero volts and the power supply system 10 enables a ZVRT as described below.

Upon restoration of grid voltage, the state machine 67 shifts the regulator 42 from state 3 to state 1 via transition path 218. While in state 1, the appropriate gain and clamp values are in the appropriate registers as described above. Upon restoration of the grid voltage to pre-determined values, the control loop 66 locks on to the grid frequency for a pre-determined period of time, and the PLL phase angle signal 110 remains below a certain threshold for a pre-determined period of time, the state machine 67 shifts the regulator 42 to state 2 from state 1 via transition path 208. While in state 2, the appropriate gain and clamp values are in the appropriate registers as described below. Shifting from state 3 to state 1 and then state 2 facilitates effecting smooth state shifting.

When the power supply system 10 is shutdown in state 3, the state machine 67 shifts regulator 42 to state 0 from state 3 via transition path 219.

FIG. 6 illustrates a tabular view of a table 220 having multiple gain constants and frequency limit values generated as a function of state as determined by the state machine 67. The table 220 includes columns 222, 224, 226, 228, and 230. State column 222 represents multiple rows 0, 1, 2 and 3 that each corresponds to a state of operation of the regulator 42. As will be appreciated, the regulator 42 may be operating in only one state at any one time. Proportional gain constant column 224 represents multiple gain constant values that may be stored in register 76, and integral gain constant column 226 represents multiple gain constant values that may be stored in register 86. Similarly, minimum frequency limit column 228 represents multiple minimum frequency limit values that may be stored in registers 96 and 108, and maximum frequency limit column 230 represents multiple maximum frequency limit values that may be stored in the registers 94 and 106. For example, when the regulator 42 is in state 0 gain value A may be stored in register 76 and C may be stored in register 86. In the exemplary embodiment, values A and C represent differing numerical values (e.g., A=2.46737 and C=328.039). Moreover, in state 0, value E may be stored in the registers 94, 96, 106, and 108. In the exemplary embodiment, value E represents a numerical value (e.g., 376.99). Differing numerical values may be used to populate the table 220 to enable the operation of power supply system 10.

When the regulator 42 is in state 1 gain values A and C are stored in registers 76 and 86, respectively. In certain embodiments, values A and C represent differing numerical values (e.g., A=2.46737 and C=328.039). Moreover, in state 1, value F is stored in registers 96 and 108, and value H is stored in registers 94 and 106. In certain embodiments, values F and H may represents differing numerical values (e.g., F=−1507.96 and H=1884.96). In other embodiments, any numerical value may be used in each register that enables operation of the power supply system 10 as described herein. Moreover, values A and C may sometimes be referred to as "hot" values and values F and H are sometimes referred to as "wide" values. Such values facilitate control loop 66 initially locking on to the grid frequency.

When the regulator 42 is in state 2 gain values B and D are stored in registers 76 and 86, respectively. In certain embodiments, values B and D may represent differing numerical values (e.g., B=0.039937 and D=0.393421). Moreover, in state 2, value G is stored in registers 96 and 108, and value I is stored in registers 94 and 106. In certain embodiments, values G and I may represent differing numerical values (e.g., G=94.2478 and H=502.529). In other embodiments, any numerical value may be stored in each register that facilitate operation of power supply system 10 as described herein. Moreover, values B and D may sometimes be referred to as "cool" values and values G and I are sometimes referred to as "narrow" values. Such values facilitate control loop 66 adjusting to frequency transients (e.g., power fluctuations) on the grid more slowly than when the regulator 42 is in state 1. This feature facilitates a more tolerant reaction of the power supply system 10 to normal, minor fluctuations of grid voltage conditions. Moreover, such values facilitate a state shift for more severe grid disturbances as discussed above. In certain embodiments, the power supply system 10 may be synchronized to the grid 12 a majority of the time with regulator 42 in state 2.

In state 3, each respective register 76, 86, 94, 96, 106, and 108 is populated according to the table 220 values in row 3. The state 3 values enable the phase angle signal 110 to be driven to a phase angle value that would be used if there were no grid disturbance (e.g. power fluctuation). By modifying the phase angle signal 110, the control loop 66 is driven to oscillate at a pre-determined frequency that is substantially similar to the nominal operating frequency (e.g., 60 Hz). Accordingly, the trip potential for the power supply system 10 is mitigated and capable of remaining electrically connected to the grid 12 with a ZVRT.

As can be appreciated, in the discussion regarding phase detection and error signals may be replaced with frequency detection and error signals for embodiments discussing a regulator 42 having an FLL. Furthermore, analysis similar to the above discussion may be used to implement a regulator 42 having a PID controller.

Technical effects of the disclosure include stability of a utility grid by providing auxiliary power to the grid and ensuring that the grid remains connected to the auxiliary power during power fluctuations (e.g., voltage changes) of the utility grid. Accordingly, the power supply system is maintained in one of at least three states according to the locking with the voltage of the grid. During large fluctuations, the power supply system may operate under one state designed to reduce trip likelihood and/or maintain electrical connection between the power supply system and the utility grid. The power supply system may operate in another state with different controls and thresholds for normal operating conditions and/or smaller fluctuations within the utility grid.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
    a power supply bank configured to provide a supplied power to a utility grid, wherein the utility grid is configured to receive auxiliary power from the power supply bank as an auxiliary power source in addition to a primary power source comprising a wind turbine, a solar power source, or other renewable energy source;
    a power converter configured to boost a supplied voltage of the supplied power and to regulate the supplied power;
    an inverter configured to regulate a first voltage and to regulate an output current, wherein the output current is the current of an output power provided to the grid;
    a voltage bus having the first voltage;
    a regulator having a state machine; and
    a first controller configured to control power flowing through the system by controlling the power converter or by controlling the first voltage by controlling the inverter,
    wherein the regulator is configured to maintain electrical connection between the power supply bank and the utility grid during a power fluctuation in the utility grid by varying between a plurality of states according to the state machine, and wherein the utility grid has a voltage of approximately 0V during the power fluctuation.

2. The system of claim 1, comprising an electrical feedback connection electrically coupling the power supply bank to the inverter, wherein the electrical feedback connection is configured to supply power to the power supply bank to charge the power supply bank.

3. The system of claim 1, comprising a power converter inductor configured to smooth a supplied current supplied from the power supply bank.

4. The system of claim 1, comprising an AC inductor configured to smooth a current supplied to the utility grid or from the utility grid.

5. The system of claim 1, wherein the supplied power comprises direct current and the inverter converts the supplied power from direct current to the output power as alternating current.

6. The system of claim 5, wherein the output power comprises a single-phase alternating current.

7. The system of claim 5, wherein the output power comprises a multi-phase alternating current.

8. The system of claim 5, wherein the output power comprises a three-phase alternating current.

9. The system of claim 1, wherein the regulator comprises a phase-locked loop (PLL), frequency-locked loop (FLL), proportional-integral-derivative (PID) controller, or a combination thereof.

10. The system of claim 1, comprising a second controller configured to control power through the system by controlling the power converter or to control the first voltage by controlling the inverter when the first controller is not controlling the power or the first voltage.

11. A method, comprising:
    supplying power having a first voltage from a power supply bank as direct current to a power converter, wherein the power supply bank comprises a battery energy storage system;
    amplifying the first voltage for the power through the power converter to a second voltage, wherein the second voltage is the voltage of an amplified power at the voltage bus;
    converting the amplified power to alternating current in an inverter;
    regulating the current of the amplified power with the inverter;
    determining a third voltage, wherein the third voltage is the voltage of a utility grid;
    supplying the amplified power to the utility grid;
    selecting from a plurality of states in a state machine according to a value of the third voltage;
    maintaining an electrical connection between the power supply bank and the utility grid during a power fluctuation by transitioning between from one state of the plurality of states to another state of the plurality, wherein the third voltage is approximately 0V during the power fluctuation.

12. The method of claim 11, wherein the maintaining the electrical connection comprises transitioning between states when the third voltage fluctuates to a low voltage due to the power fluctuation.

13. A controller comprising:
    a regulator having a state machine that selects from a plurality of states according to a utility grid voltage;
    wherein the controller is configured control a voltage flowing through a plurality of voltage busses using at least one of a plurality of power converters or control the voltage using at least one of a plurality of inverters;
    wherein the PLL regulator is configured to maintain connection between a power supply bank and a utility grid supplying the utility grid voltage during a power fluctuation by using the state machine to transition between two of the plurality of states during the power fluctuation, wherein the power supply bank is configured to provide power as direct current, and wherein the utility grid voltage is approximately 0V during the power fluctuation, wherein the power supply bank comprises a battery energy storage system.

14. The controller of claim 13, wherein the plurality of power converters comprises at least two power converters electrically connected in parallel to each other.

15. The controller of claim 13, wherein utility grid is configured to receive auxiliary power from the power supply bank as an auxiliary power source in addition to a primary power source that provides power at least partially intermittently.

16. The controller of claim 13, wherein the at least one controller comprises a controller for each pair of the plurality of power converters and the plurality of inverters.

17. The controller of claim 13, wherein the at least one controller comprises one controller configured to manage all of the plurality of power converters and the plurality of inverters.

* * * * *